United States Patent [19]

Rush

[11] 4,268,090
[45] May 19, 1981

[54] IMBALANCE COMPENSATING VEHICLE WHEEL ATTACHMENT

[75] Inventor: Kim E. Rush, Irvine, Calif.

[73] Assignees: William McCahill; Barbara L. Anderson, both of Huntington Beach, Calif.; part interest to each

[21] Appl. No.: 157,547

[22] Filed: Jun. 9, 1980

[51] Int. Cl.³ .......................... B60B 7/04; B60B 13/00
[52] U.S. Cl. ................................ 301/5 BA; 301/37 R; 74/573 R
[58] Field of Search ............. 301/37 R, 37 N, 37 CM, 301/37 S, 37 SS, 5 B, 5 BA, 37 B, 41 W; 74/573 R, 574; 295/6-7

[56] References Cited
U.S. PATENT DOCUMENTS 3,312,505  4/1967  Hutchins ....................... 301/37 SS
4,178,041  12/1979  Rush ............................. 301/37 R X Primary Examiner—Charles A. Marmor
Attorney, Agent, or Firm—Fulwider, Patton, Rieber, Lee & Utecht

[57] ABSTRACT

An imbalance compensating vehicle wheel attachment having a rim structure for mounting to a vehicle wheel, and further having a plurality of spokes or sectors coupled to the rim structure and extending radially inwardly to a hub structure. A mounting arrangement is provided to couple the inward extremities of the sectors to the hub structure to enable radial slidable movement of the sectors relative to the hub structure whereby the masses of the hub structure and sectors are dynamically movable to establish a radius of gyration tending to compensate for any wheel imbalance.

11 Claims, 8 Drawing Figures

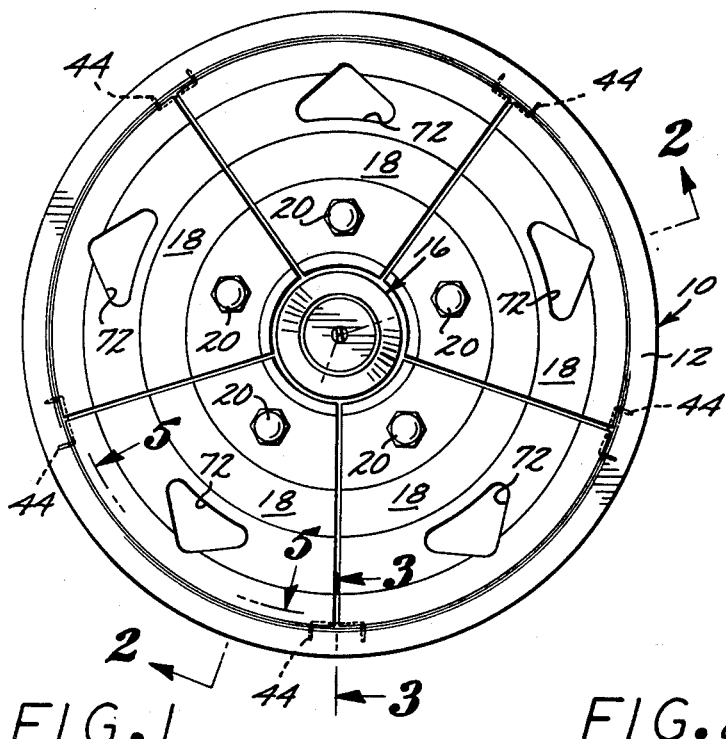
FIG.1
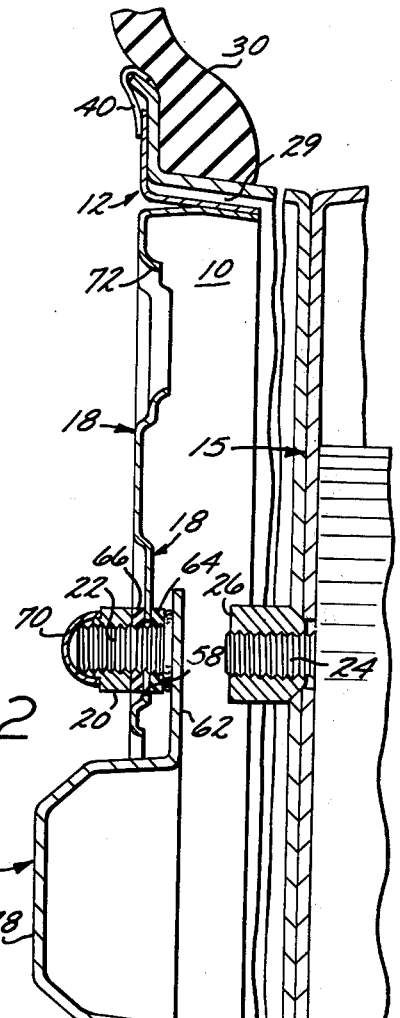
FIG.2
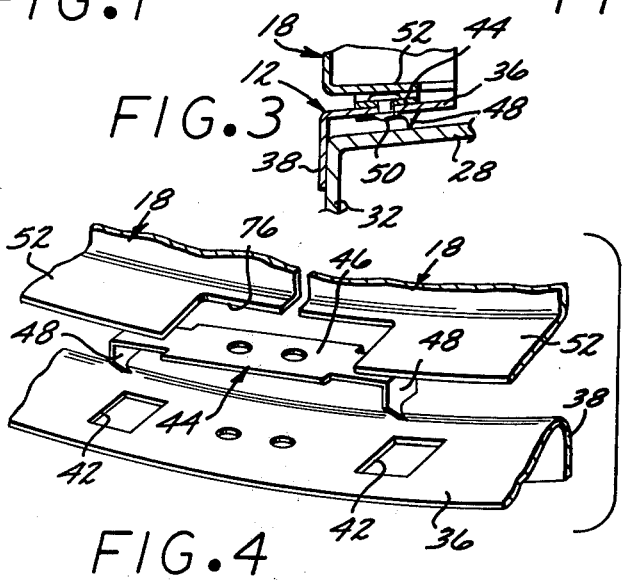
FIG.3
FIG.4
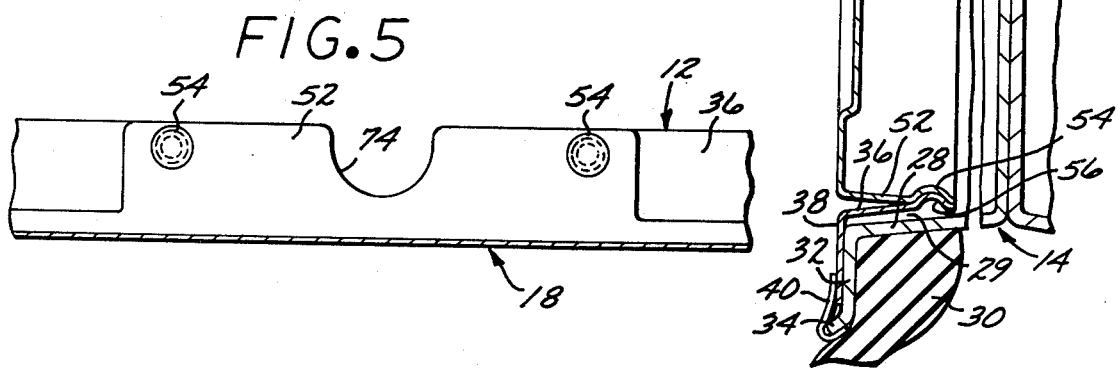
FIG.5

IMBALANCE COMPENSATING VEHICLE WHEEL ATTACHMENT

BACKGROUND OF THE INVENTION

1. Field of the Invention

The present invention relates to a vehicle wheel attachment dynamically operable to compensate for wheel imbalance.

2. Description of the Prior Art

Various forces acting upon a tire tend to cause wheel imbalance, particularly generally upwardly directed forces produced by road imperfections and bumps. The resulting tire bounce reduces the traction or "footprint" of the tire, causing rider discomfort, increased tire wear, less efficient transfer of propulsive torque from the tire to the road, and changes in wheel angular velocity. There is a consequent loss of fuel economy, impaired vehicle stability, and reduced braking efficiency. Other harmful effects of tire bounce are a reduced ability of the wheel to steer or track in a straight line, poorer traction in snow and ice, a greater tendency to hydroplane in rainy weather, and accelerated deterioration in vehicle front end alignment.

Road hazards typically also produce a lateral force vector which acts against the tire side and tends to prevent proper wheel tracking.

Even in instances in which a road is relatively smooth, forces are inherent in the rolling of a tire which produce wheel imbalance. In this regard, usual balancing of a wheel is done either by taking it off the vehicle and arranging it upon or spinning it in a balancing device, or by hoisting the vehicle and spinning the wheel in place. Small weights are placed on the wheel according to the imbalances detected.

However, when a vehicle is on the road each tire is characteristically slightly flattened or deformed by the weight of the vehicle and the center of gyration of the wheel is no longer coincident with the axis of wheel rotation. This off-center relation introduces a vibration or wheel bounce characterized by the same undesirable consequences as the wheel bounce caused by road irregularities.

Certain wheel covers of the prior art, such as those described in U.S. Pat. No. 3,312,505, issued Apr. 4, 1967 for "Wheel Cover," and in U.S. Pat. No. 4,178,041, issued to me on Dec. 11, 1979 for "Wheel Attached Balancing Device," are made relatively heavy to increase the angular momentum of the wheels to which they are mounted. This has the desirable effect of providing greater resistance to forces tending to change the angular momentum. There is a smaller angular deviation of the wheel axis for any applied force. This has a desirable gyroscopic effect in reducing the adverse consequences of side loads on the tire. However, there is an insufficient compensation for certain other types of wheel imbalance.

In this regard, the wheel covers of the aforementioned patents include a central hub structure and radially extending spokes or sectors arranged to project axially in a shallow conical configuration. This conical configuration tends to flatten into a vertical plane when the associated wheel is rotating at relatively high speeds. as the flattening occurs the sectors pass outwardly against a trim ring mounted to the vehicle wheel. The cover is designed so that movement of the hub structure is directly translated into radial forces upon the sectors. This was intended to aid in holding the trim ring in place upon the wheel, and also was intended to load certain portions of the rim differentially, depending upon the stress being experienced by the associated sectors. This was supposed to reduce vibratory motion occurring from an unbalanced condition of the wheel. Neither of these objectives was satisfactorily accomplished.

SUMMARY OF THE INVENTION

According to the present invention, an imbalance compensating vehicle wheel attachment, preferably in the form of a decorative wheel cover, is provided which is deliberately designed to enable relatively free radial movement of a hub structure relative to a plurality of spokes or sectors extending radially from the hub structure. The radially outward extremities of the sectors are resiliently coupled to a surrounding rim structure which is attachable to the vehicle wheel, the resilience of the coupling tending to bias the sectors radially inwardly in opposition to forces, including centrifugal forces, which tend to move the sectors radially outwardly.

With this arrangement, the centers of mass or gravity of the hub structure and each of the sectors is adapted to change dynamically in response to road shocks and tire rolling action, and furthermore, to change in a manner which it has been found establishes an instantaneous radius of gyration which tends to compensate for dynamically occurring wheel imbalances.

In a preferred embodmient, the radially inwardly located extremities of the sectors are provided with enlarged openings through which project studs carried by the hub structure. Nuts snugly tightened upon the studs hold the sectors in position, but the nuts are not tight enough to prevent relatively easy relative movement between the hub structure and the individual sectors.

Use of the present vehicle wheel attachment has been found to compensate for wheel imbalance. In addition, it has been found that such compensation is accompanied by a surprising improvement in fuel economy. The reduced tire bounce, better traction and increased vehicle stability appear to be very closely related to the surprising increase in vehicle miles traveled per gallon of fuel.

Other objects and features of the invention will become apparent from consideration of the following description taken in connection with the accompanying drawings.

BRIEF DESCRIPTION OF THE DRAWING

FIG. 1 is a side elevational view of the present vehicle wheel attachment;

FIG. 2 is an enlarged view taken along the lines 2—2 of FIG. 1;

FIG. 3 is an enlarged view taken along the line 3—3 of FIG. 1;

FIG. 4 is an exploded perspective view of portions of adjacent sectors and the trim ring, particularly illustrating a gripper element;

FIG. 5 is an enlarged view taken along the line 5—5 of FIG. 1;

DESCRIPTION OF THE PREFERRED EMBODIMENT

Figures 6, 7, 8:
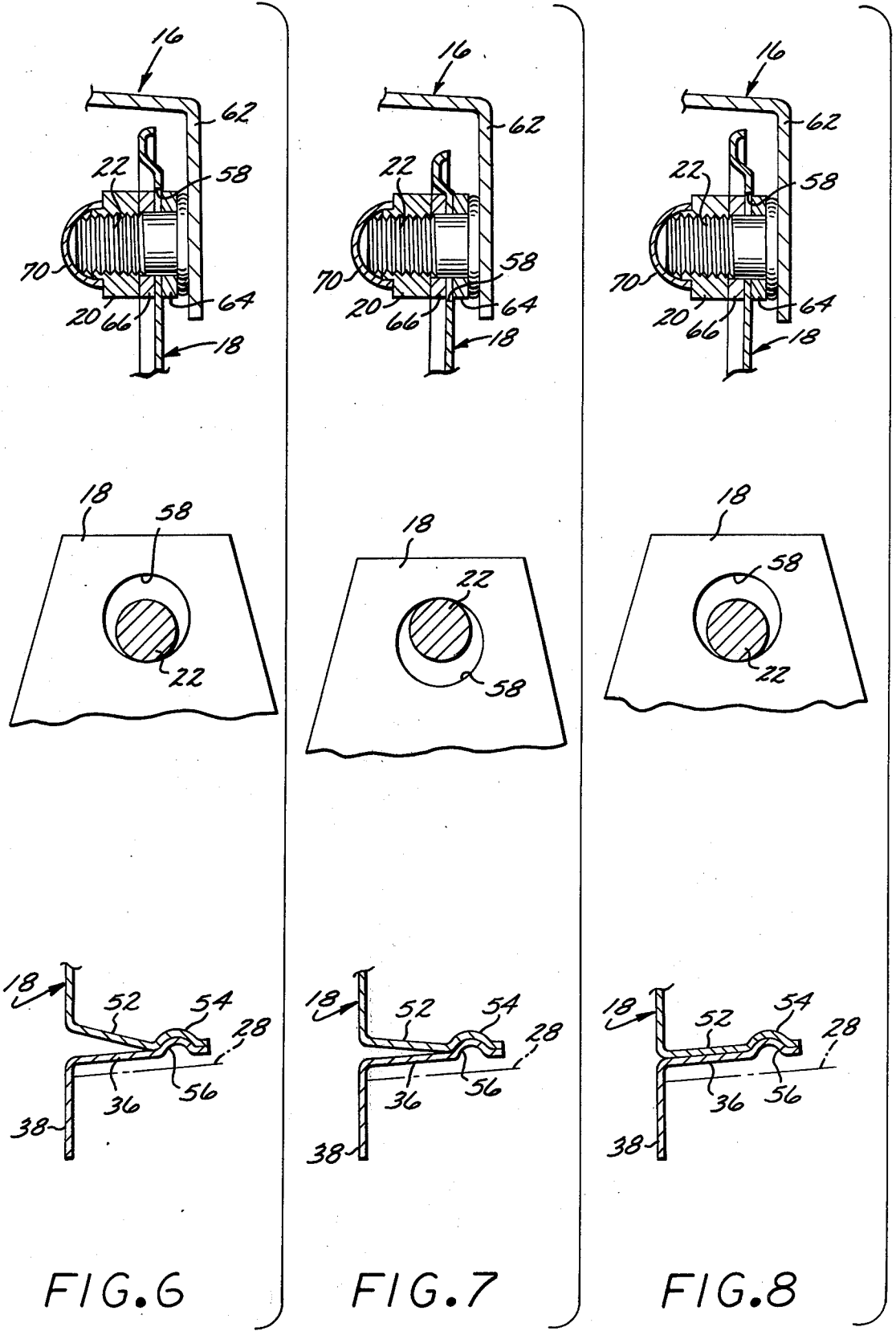
FIG. 6 is a partially diagrammatic view of certain of the wheel attachment components in their static condition, the upper third of the figure showing a cross section of the inner extremity of a sector and the interconnecting fastener; the middle third of the figure showing the inner extremity of the sector in elevation, with the fastener shown in cross-section; and the lower third of the figure showing a cross-section of portions of the trim ring and outer extremity of the sector.
FIG. 7 is a showing similar to that of FIG. 6, but with the components in their dynamic state, as they would appear when the vehicle is in motion.
FIG. 8 is a showing similar to that of FIG. 7, but illustrating the components upon engagement of a road obstacle by the tire.

Referring now to the drawings and particularly to FIGS. 1 through 5, there is illustrated a wheel attachment device or cover 10 according to the present invention and comprising, generally, a rim structure or trim ring 12 adapted for mounting to the tire rim 14 of a vehicle wheel 15; a hub structure 16 located centrally of the trim ring 12 and adapted for axial alignment of its center of gravity with the center of gravity and axis of rotation of the wheel 15; a plurality of generally triangularly shaped spokes or sectors 18 uniformly circumferentially arranged about and radiating outwardly from the hub structure 16, the radially outwardly located extremities of the sectors 18 being resiliently coupled, as will be seen, to the trim ring 12; and a plurality of mounting means, each comprising a nut 20 and a bolt 22, coupling the radially inwardly located extremities of the sectors 18 to the hub structure 16.

The vehicle wheel 15 is typical of vehicle wheels having a plurality of openings to receive threaded bolts 24 by which the wheel 15 is attachable by lug nuts 26 in position adjacent the vehicle axle hub.

The tire rim 14 of wheel 15 includes a circumferential main flange 28 having an outer face for seating a usual and conventional tubeless tire 30.

The outer extremity of the main flange 28 is extended radially outward to form a bead flange 32 for constraining the tire 30 against lateral separation from the wheel, as illustrated in FIG. 2. The radially outward extremity of the bead flange 32 is curved axially outwardly to form a short flange or lip 34 which tends to follow the contour of the tire. The lip 34 is typically utilized as an attachment flange for the usual fastening clips of small balancing weights (not shown) used in conventional tire balancing systems. However, it is used for a different purpose in the present device, as will be seen.

The trim ring 12 is preferably made of steel and comprises an annular band having a circumferential main flange 36 whose diameter is less than the diameter of the inner surface of the tire main flange 28 to define an annular space 29 therebetween.

The outer extremity of the trim ring main flange 36 is radially outwardly formed to provide a bead flange 38 which rests against the wheel bead flange 32. A plurality of generally U-shaped fasteners or clips, one of which is illustrated at 40 in FIG. 2, are utilized to insure that the trim ring bead flange 38 is held in position against the wheel bead flange 32. The clips are made of spring material such that engagement of the opposed legs of each clip on the respective bead flanges 32 and 38 securely holds the trim ring 12 in position upon the wheel. The plurality of clips 40 are generally equally circumferentially spaced about the periphery of the trim ring bead flange 38.

As best seen in FIGS. 3 through 5, in the area adjacent the radial joint between each pair of sectors 18, the trim ring main flange 38 is characterized by a pair of circumferentially spaced apart openings 42, one on each side of the joint defined between the adjacent side extremities of each pair of sectors 18.

A gripper member 44 of U-shape is located adjacent each pair of openings 42 for engagement with the tire rim main flange 28 through the openings 42. Each gripper member 44 is made of relatively heavy gauge, high grade spring steel and its base 46 is attached by a pair of rivets, one of which is shown at 50 in FIG. 3, to the inner surface of the trim ring bead flange 38. The opposite legs 48 of the gripper member extend through the openings 40 and are characterized by sharp points directed radially and outwardly. The clearance between the trim ring flange 36 and the tire rim flange 52, and the resilient bowing of the gripper base 46, enables the trim ring to be pressed axially inwardly to mount it to the wheel 15 as illustrated. When this is done, the sides of the points of the gripper legs 48 scrape across the flange 28, but opposite or axially outward movement of the trim ring 12 is prevented because the points dig into the metal of the flange 28. As will be seen, the sectors 18 are urged outwardly by centrifugal and other forces and exert extraordinary forces on the gripper points to maintain the wheel cover 10 in mounted position. The use of the clips 40 is an extra or backup arrangement to make certain that the cover 10 cannot come off in normal operation.

As best seen in FIGS. 4 and 5, the radially outwardly located extremities of each sector 18 are axially inwardly formed to define a resilient bias flange 52 characterized by a pair of inwardly directed, circumferentially spaced-apart recesses or seats 54 whose concave undersides closely receive complemental recesses or seats 56 formed in the trim ring 36. Although it is contemplated that this arrangement will provide sufficient integrity of connection between the sectors 18 and the trim ring 12 to hold the sectors in position during operation of the wheel cover 10, the seats 54 and 56 are preferably spot-welded together.

The radially inwardly located extremity of each sector 18 includes an enlarged circular opening 58, as best seen in FIGS. 6 through 8. The considerably smaller diameter threaded bolt or stud 22 projects through the opening 58. The studs 22 for the various sectors 18 are circumferentially arranged upon and rigidly attached by welding or the like to a generally vertically oriented annular backplate 62 which forms a part of the hub structure 16.

A resilient fibrous washer 64 is mounted on each stud 22 between the plate 62 and the sector 18, and a similar washer 66 is mounted on the stud between the sector 18 and the nut 20. The nuts 20 are tightened upon the studs 22 snugly but not tightly to secure the sectors 18 to the backplate 62. In one satisfactory embodiment, each nut 20 is tightened upon its associated stud 22 at approximately 50 pounds of torque. A separable dome 70 is integral with each nut 22, and is preferably dimensioned to separate or pop off the remainder of the nut 22 if the tightening torque exceeds the preferred 50 pounds. If the torque exceeds this value, the associated stud 22 engages and forces the dome 70 off the nut 20.

Each sector 18 includes a ventilating opening 72 in its vertical face to provide adequate cooling of the adjacent vehicle brakes. In addition, the openings 72 allow access to the usual tire inflation valve (not shown) in five different circumferential positions of the cover 10 relative to the vehicle wheel 15.

The bias flange 52 and trim ring main flange 36 include cutouts 74, as seen in FIG. 5, through which the tire valve can project. In addition, as seen in FIG. 4, the corners of the adjacent bias flanges 52 of each pair of sectors 18 are cut away to provide a rectangular opening 76 in alignment with the midportion or base 46 of the associated gripper member 44. This provides clearance between the base 46 of each gripper and the associated pair of sectors 18. However, the outer corners of the pair of sector 18 defining the opposite ends of each opening 76 rest upon the gripper member 44 above the legs 48. With this arrangement the sectors 18 exert a relatively great force upon the legs 48, as previously mentioned, when the sectors 18 move radially outwardly under the influence of centrifugal and other forces.

The sectors 18 are preferably made of relatively heavy gauge steel, in the order of 0.048 inches in wall thickness. The hub structure 16 is also made of heavy gauge steel, preferably twice the wall thickness of sector 18, such that the sectors 18 and the hub structure 16 weigh approximately three and two pounds, respectively, for a 13 inch diameter vehicle wheel.

The hub structure 16 is characterized by an axially outwardly projecting dome or hub 78 which may be decorated or otherwise ornamentally configured for aesthetic purposes.

The wheel cover 10 is mounted to the wheel 15 by forcibly pressing the cover axially inwardly until the trim ring bead flange 38 bears up against the wheel bead flange 32, as seen in FIG. 2. The clips 40 are then placed in position to ensure that the cover 10 will remain in position at all speeds and despite heavy road shocks.

As will be apparent from FIG. 2, the hub structure 16 is located centrally of the wheel 15 for static axial alignment of its center of gravity with the center of gravity and axis of rotation of the wheel and tire combination.

In the mounted position of the cover 10, the points of the gripper legs 48 engage the wheel main flange 28 to aid in maintaining the cover 10 in mounted position.

The general vertical orientation of the cover 10 provides optimum angular momentum to the wheel 15, as will be apparent.

As will be seen, it is important for the studs 22 to be relatively freely movable relative to the margins defining the openings 58. In this regard, it is theorized that, as seen in FIG. 6, with the vehicle at rest the studs 22 are located in the radially outward portions of the openings 58. This is for the reason that the sectors 18, in a static condition, are biased radially inwardly by the flanges 52, which are cantilever mounted at the seats 54.

When the vehicle is moving at a significant speed, such as at least 10 or 15 miles per hour, the centrifugal force imparted to the sectors 18 causes each sector 18 to move radially outwardly under the influence of centrifugal force so that its flange 52 is biased radially outwardly, and the stud 22 is then located in approximately the radially inward portion of the opening 58, as seen in FIG. 7.

On encountering a road bump, for example, the sector or sectors 18 closest to the bump are relatively forcibly urged radially outwardly against the bias of their flanges 52, as seen in FIG. 8. There is a corresponding radially outward movement of the studs 22 of those sectors until they are located adjacent the radially outward portion of the opening 60, as seen in FIG. 8. It is theorized that the stud 22 of the sector 18 closest to the bump experiences the greatest relative movement, and that the studs 22 of the sectors 18 on either side also experience this relative movement, but to a lesser extent.

The relative movement between the sectors 18 and the studs 22 of the hub structure 16 is permitted by virtue of the lack of complete tightening of the nuts 20, as previously described, and by virtue of the presence of the fibrous washers 64 and 66, which are characterized by a lower coefficient of friction than metal. The described movement of each particular sector 18 is substantially independent of the other sectors 18. However, it should be understood that the other sectors 18 are also undergoing relative movement, the extent and direction of such movement depending upon their positions relative to the point of engagement between the tire and the road surface, and relative to the location of any other unbalancing forces upon the wheel and tire combination.

Although the foregoing description of the condition of the components in FIG. 8 has been made in conjunction with impact of the tire against a road bump, the same phenomenon is believed to occur as each sector rotates into adjacency with the road surface.

It is believed that as a tire rotates into contact with the road surface, the resistance of that road surface to the tire tends to change the angular momentum of the tire and develops a deformation or outward bulge in the tire, something like the bow wave which develops at the bow of a ship passing through the water. This outward bulge is also like a road bump over which the tire must roll, and the same action of the wheel cover to compensate for imbalances generated by a road bump takes place to compensate for the tire deformation or bulge. That is, the radially extended sectors 18 adjacent the tire bulge, and the radially adjusted position of the hub structure 16, develop an instantaneous change in the center of gyration of the total mass that tends to thrust in the general direction of the deformation or bulge, helping to flatten or flex the tire as its rotation continues, and thereby reducing rolling resistance.

The exact theory of operation is unknown and applicant offers the foregoing for possible assistance to those skilled in the art. Whether or not a device comes within the scope of applicant's invention is to be determined by the scope of the appended claims, and not by whether or not such devices operate according to the foregoing theory or theories. What is known is that the described structure of the wheel cover 10 provides a surprising improvement in fuel economy.

Similary, FIGS. 6 through 8 are intended to illustrate how the cover components are adapted to move continuously, and how such dynamic movement is believed to establish instantaneous adjustments or changes in the radius of gyration to compensate for changes in the locations of the centers of gravity of the masses of the cover components, and to compensate for changes in the magnitude and character of the forces which develop against the tire and wheel as the tire encounters road bumps, and as it continually bulges adjacent the road surface, flexes and then flattens.

From the foregoing, it is seen that a wheel cover has been provided which is operative to establish a radius of gyration to compensate for the changed location of the center of gravity and center of gyration of the tire/wheel combination attendant flexing of a tire over a road surface, and to a greater extent, to compensate for tire bounce from road bumps. As previously indicated, the center of gyration is adjusted downwardly toward the road surface to provide an additional force or better "footprint" of the tire against the road surface, and to reduce upward acceleration of the tire. The consequent more continuous and firmer tire traction is apparently responsible for much of the increase in vehicle fuel economy.

Various modifications and changes may be made with regard to the foregoing detailed description without departing from the spirit of the invention.

I claim:

1. An imbalance compensating vehicle wheel attachment comprising:
   a rim structure adapted for mounting to a vehicle wheel which mounts a tire;
   hub structure located centrally of said rim structure and adapted for static axial alignment of its center of gravity with the center of gravity and axis of rotation of the wheel and tire combination;
   a plurality of sectors circumferentially arranged about and radiating outwardly from said hub structure, the radially outwardly located extremities of said sectors being resiliently coupled to said rim structure whereby said sectors are adapted for resilient radial movement relative to said rim structure; and
   mounting means coupling the radially inwardly located extremities of said sectors to said hub structure, said mounting means enabling radial slidable movement of said sectors relative to said hub structure whereby, on rotation of the wheel and tire combination, said hub structure and each of said sectors are adapted to move radially independently of each other thereby to establish a radius of gyration tending to compensate dynamically for a wheel imbalance.

2. An imbalance compensating vehicle wheel attachment according to claim 1 wherein said rim structure comprises an annular band normally spaced radially inwardly of the vehicle wheel and including a radially extending bead flange adapted for engagement with the vehicle wheel, said band including a plurality of pairs of circumferentially spaced openings; and a plurality of resilient gripper members having pointed legs extending through said openings, respectively, for engagement with the vehicle wheel, said radially outwardly located extremities of said sectors engaging said gripper members whereby said pointed legs are forcibly urged radially outwardly upon radial outward movement of said sectors in response to centrifugal and other forces.

3. An imbalance compensating vehicle wheel attachment according to claim 2 wherein said radially outwardly located extremities of said sectors each comprise an axially inwardly directed flange located radially inwardly of said annular band, said flange and said band being axially convergent and interengaged adjacent their axially inwardly located edges at circumferentially spaced points whereby said sectors are enabled to move radially outwardly through resilient flexure of said flanges.

4. An imbalance compensating vehicle wheel attachment according to claim 3 wherein said flanges and said band are welded at said spaced points.

5. An imbalance compensating vehicle wheel attachment according to claim 1 wherein said mounting means comprises:
   a plurality of threaded studs integrally mounted to said hub structure, and said radially inwardly located extremities of said sectors include openings, respectively, receiving said studs, each of said openings being enough larger than an associated one of said studs to enable said radial movement of said sectors relative to said hub structure; and a plurality of nuts mounted to said studs.

6. An imbalance compensating vehicle wheel attachment according to claim 5 and including washer means on said studs to facilitate said radial movement of said sectors relative to said hub structure.

7. An imbalance compensating vehicle wheel attachment according to claim 5 wherein each of said nuts includes an integral dome engageable by an associated one of said studs upon development of a predetermined nut tightening torque, and separable from the associated one of said nuts upon development of a torque in excess of said predetermined torque.

8. An imbalance compensating vehicle wheel attachment according to claim 1 wherein said sectors are disposed in a substantially vertical plane in the static condition of the vehicle wheel.

9. An imbalance compensating vehicle wheel attachment comprising:
   an annular trim ring having a plurality of resilient gripper members projecting through openings in said trim ring for engagement with the rim of a vehicle wheel which mounts a tire;
   hub structure located centrally of said trim ring and adapted for static axial alignment of its center of gravity with the center of gravity and axis of rotation of the wheel and tire combination;
   a plurality of sectors circumferentially arranged about and radiating outwardly from said hub structure, portions of the radially outwardly located extremities of said sectors being located in overlying relation to portions of said gripper members whereby said gripper means are forcibly urged radially outwardly for gripping said rim upon radially outward movement of said sectors; and
   a plurality of fastener assemblies coupling the radially inwardly located extremities of said sectors to said hub structure, each of said fastener assemblies enabling radial slidable movement of one of said sectors relative to said hub structure whereby, on rotation of the wheel and tire combination, said hub structure and each of said sectors are adapted to move radially independently of each other thereby to establish a radius of gyration tending to compensate dynamically for a wheel imbalance.

10. An imbalance compensating vehicle wheel attachment according to claim 9 wherein said portions of said radially outwardly located extremities of said sectors comprise axially directed flanges resiliently deformable for biasing said sectors radially inwardly.

11. An imbalance compensating vehicle wheel attachment according to claim 9 and including a plurality of clips circumferentially spaced about said trim ring and adapted for attachment to the vehicle wheel to hold said wheel attachment on said vehicle wheel.

* * * * *